United States Patent [19]

Patel

[11] Patent Number: 4,663,653
[45] Date of Patent: May 5, 1987

[54] VERTICAL DETAIL ENHANCER

[75] Inventor: Chandrakant B. Patel, Hopewell, N.J.

[73] Assignee: RCA Corporation, Princeton, N.J.

[21] Appl. No.: 800,823

[22] Filed: Nov. 22, 1985

[51] Int. Cl.[4] ............................................. H04N 9/64
[52] U.S. Cl. ................................... 358/11; 358/37
[58] Field of Search .................... 358/11, 12, 13, 14, 358/15, 16, 21 R, 31, 36, 37, 64, 135, 140, 153, 160, 166, 217, 242

[56] References Cited

U.S. PATENT DOCUMENTS

| | | | |
|---|---|---|---|
| 4,245,237 | 1/1981 | Lagoni | 358/31 |
| 4,322,750 | 3/1982 | Lord et al. | 358/140 |
| 4,400,719 | 8/1983 | Powers | 358/21 R |
| 4,429,327 | 1/1984 | Oakley et al. | 358/12 |
| 4,509,071 | 4/1985 | Fujimura et al. | 358/11 |
| 4,539,592 | 9/1985 | Tanaka et al. | 358/140 |
| 4,551,753 | 11/1985 | Nishizawa et al. | 358/140 |
| 4,558,347 | 12/1985 | Pritchard | 358/11 |
| 4,573,068 | 2/1986 | Dorsey et al. | 358/11 |
| 4,583,113 | 4/1986 | Pritchard | 358/11 |

FOREIGN PATENT DOCUMENTS 2110900 6/1983 United Kingdom .

OTHER PUBLICATIONS

R. F. Graf, "Modern Dictionary of Electronics", 5th Ed., 1977, pp. 60, 505, 567, 785.

*Primary Examiner*—John W. Shepperd
*Attorney, Agent, or Firm*—Paul J. Rasmussen; Eric P. Herrmann; David N. Caracappa

[57] ABSTRACT

A vertical detail enhancer for use in a progressive scan video signal processor is disclosed. An interstitial luminance signal producer produces interstitial luminance signals in response to interlaced luminance signals from a source of such signals. Means modify the interlaced and interstitial luminance signals for enhancing the vertical detail of the displayed image by adding only overshoot to leading edges and only undershoot to trailing edges. Further means sequence the vertical detail enhanced interlaced and interstitial luminance signals to produce a signal representing a progressively scanned image.

11 Claims, 8 Drawing Figures

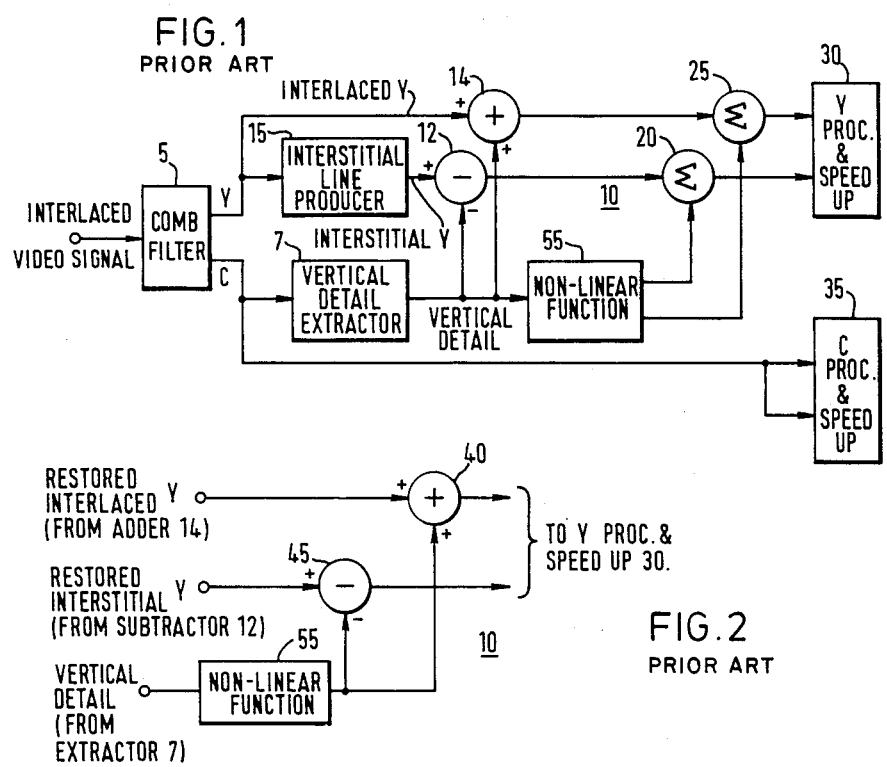
FIG. 1 PRIOR ART
FIG. 2 PRIOR ART
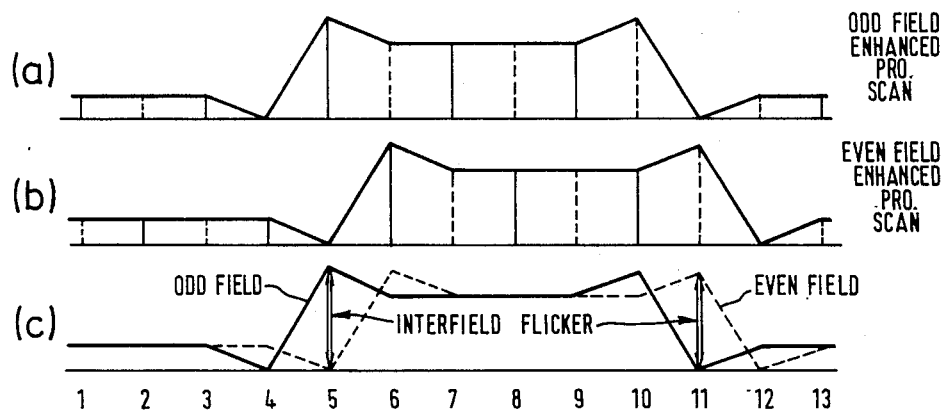
FIG. 4 PRIOR ART

4,663,653

VERTICAL DETAIL ENHANCER

The present invention relates to vertical detail enhancement in a video signal processor which produces a progressively scanned image signal.

It has been found desirable in video signal processors to modify the video signal in order to enhance the appearance of vertical transitions of the luminance component on a reproduced image. This is particularly true in color television video signal processors which use a comb filter to separate the luminance and chrominance components from the composite video signal. For example, a line delay comb filter adds signals representing two adjacent lines (in essence, taking their average) to generate a comb filtered luminance signal. This averaging reduces the vertical resolution.

The above is also true when a progressively scanned image is reproduced. In such a case, signals representing interstitial lines are produced from the signals representing interlaced lines received by the video signal processor. One method of producing a signal representing an interstitial line to be displayed between two interlaced lines is to use, as the interstitial line signal, the average of the signals representing the two interlaced lines between which the interstitial line is to be displayed (called a line progressive scan system). In a video signal processing system including a comb filter, the signal representing the interstitial line may be the comb filtered luminance signal representing the current image line.

One standard enhancement for vertical transitions is to artificially make the transition seem larger. For example, an undershoot, and overshoot are generated for a leading edge transition; and an undershoot and backswing are generated for a trailing edge transition. In other words, just before a dark-to-light transition, the reproduced image is made darker, and just after the transition, the reproduced image is made brighter. In a progressively scanned video signal processor, this enhancement is applied to both the received signals representing interlaced lines and the produced signals representing interstitial lines.

It is known that if a vertical detail enhancement signal, generated in response to the received signal representing interlaced lines, is added to the received signal representing interlaced lines and is subtracted from the produced signal representing interstitial signal, then vertical transitions in the progressively scanned image are enhanced. An example of such a system is described in U.S. Pat. No. 4,558,347 entitled "Progressive Scan Television System Employing Vertical Detail Enhancement" issued Dec. 10, 1985 to Pritchard et al.

In the above-mentioned U.S. Patent Application, it was noted that that arrangement may effect some residual flickering where transitions occur. This patent application concluded, however, that the overall effect is subjectively pleasing.

In accordance with the present invention, it was determined that the residual flickering resulting from the arrangement of the above-mentioned U.S. Patent Application is particularly objectionable under certain circumstances. For example, displayed letters or other figures having well defined horizontal lines, tend to have a flicker at the upper and lower edge which make those edges fuzzy. With the increasing use of video signal displays as output devices for computers, and development of over-the-air information systems, it becomes desirable to reduce the flickering without unduly degrading the vertical detail enhancement. It is especially desireable to reduce the flicker within the memory constraints of a line progressive scan system.

Apparatus in accordance with the present invention is a vertical detail enhancer. Such apparatus includes a source of interlaced luminance signals. Interstitial luminance signals are produced in response to the interlaced luminance signals. Transitions in the interlaced and interstitial luminance signals are modified by having only overshoot for transitions of a given sense, and by having only undershoot for transitions opposite the given sense to produce vertical detail enhanced interlaced and interstitial luminance signals. Further means sequences the vertical detail enhanced interlaced and interstitial luminance signals to produce a signal representing a progressively scanned image.

In the drawings:

FIG. 1 is a block diagram of a video signal processor embodying a vertical detail enhancer;

FIG. 2 is a block diagram of a prior art vertical detail enhancer which may be used in the video signal processor of FIG. 1;

FIG. 4 shows waveform diagrams illustrating the source of flickering in the vertical detail enhancer of FIGS. 1 and 2;

Figure 3:
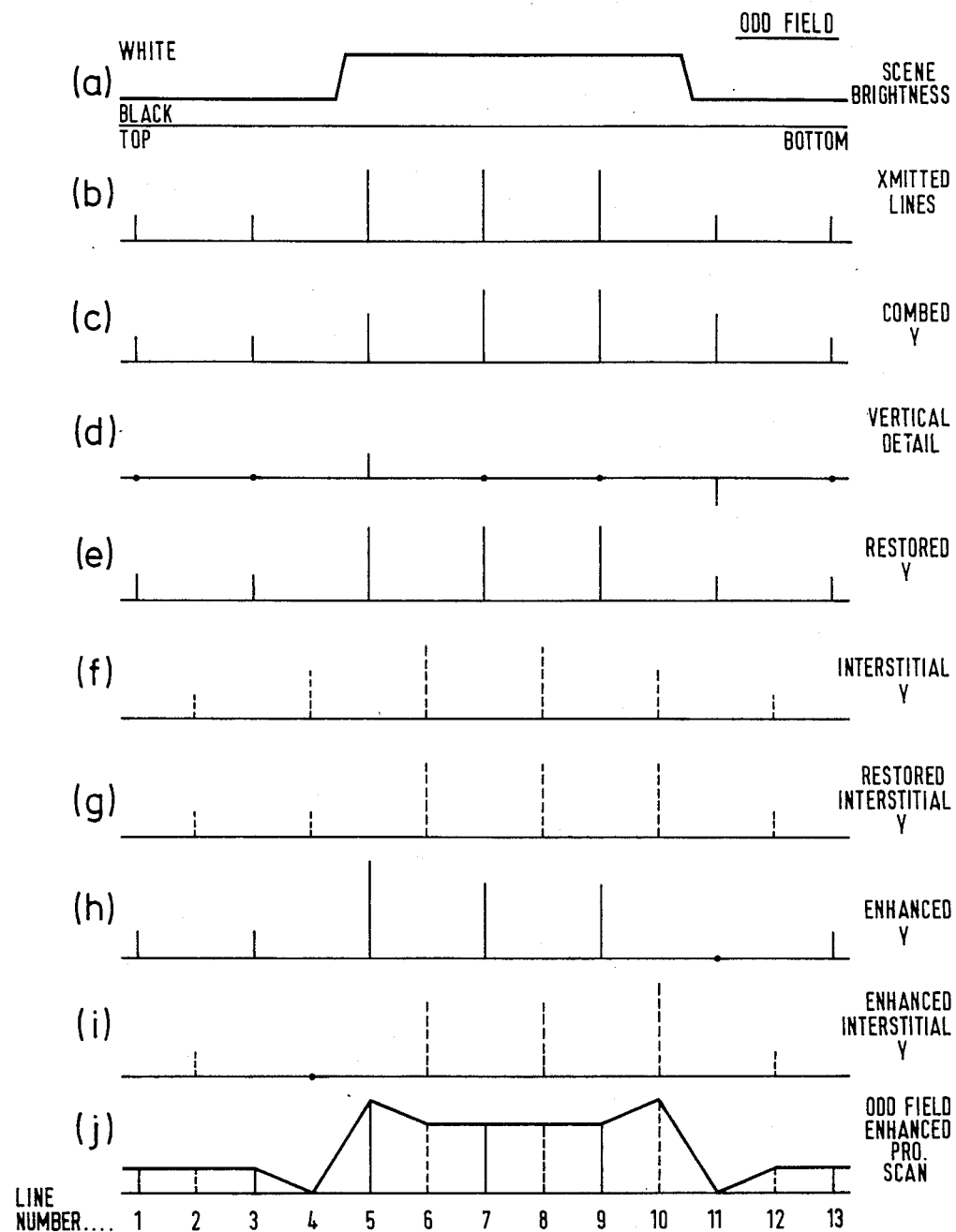
FIG. 3 shows waveform diagrams useful in understanding the operation of the appartus illustrated in FIGS. 1 and 2.

FIG. 1 illustrates a vertical detail enhancer which operates in a similar manner to that described in the above-mentioned U.S. Pat. No. 4,558,347. In FIG. 1, an interlaced video signal from, for example, the front end of a standard color television receiver (not shown) is supplied to a comb filter 5. Comb filter 5 produces a comb filtered luminance Y and a comb filtered chrominance C signal. The comb filtered luminance signal Y is supplied to an interstitial line producer 15 and one input of an adder 14. The output of adder 14 is supplied to one input of a signal combiner 25. The output of signal combiner 25, representing the vertical detail enhanced interlaced signal, is supplied to one input of luminance processing and speed up circuit 30. The output of interstitial line producer 15 is coupled to one input of a subtractor 12. The output of subtractor 12 is supplied to one input of a signal combiner 20. The output of signal combiner 20, representing the vertical detail enhanced interstitial signal, is supplied to another input of luminance processing and speed up circuit 30.

The comb filtered chrominance signal C is supplied to vertical detail extractor circuit 7 and both inputs of chrominance processing and speed up circuit 35. The output of vertical detail extractor 7 is supplied to other inputs of adder 14 and subtractor 12 respectively, and to a non-linear function circuit 55. The outputs of non-linear function circuit 55 are coupled to other inputs of signal combiners 20 and 25 respectively. Chrominance and luminance processing and speed up circuits 35 and 30 respectively process, and properly sequence the signals at their respective inputs to create a signal representing a progressively scanned image. They could for example, supply such signals to an image display device (not shown) which could display a progressively scanned image. The operation of FIG. 1 will be explained below.

In FIG. 2, vertical detail information from vertical detail extractor 7 of FIG. 1 is supplied to non-linear function circuit 55. Non-linear function circuit 55 generates a vertical detail enhancement signal. One appropriate non-linear function is to core low amplitude signals, to peak medium amplitude signals and to pare high amplitude signals. An example of such a function is described in U.S. Pat. No. 4,245,237 entitled "Controllable Non-Linear Processing of Video Signals" issued Jan. 13, 1981 to W. A. Lagoni.

The vertical detail enhancement signal from non-linear function circuit 55 is supplied to one input of adder 40 and subtractor 45 respectively. The vertical detail restored interlaced comb filtered luminance signal Y is supplied to another input of adder 40. The output of adder 40 is the vertical detail enhanced interlaced luminance signal. The vertical detail restored interstitial comb filtered luminance signal is supplied to another input of subtractor 45. The output of subtractor 45 is the vertical detail enhanced interstitial comb filtered luminance signal. These two vertical detail enhanced comb filtered luminance signals are supplied to luminance processing and speed up circuit 30 of FIG. 1.

The operation of the prior art vertical detail enhancer illustrated in FIGS. 1 and 2 can be better understood by reference to the waveform diagrams illustrated in FIG. 3. Waveform (a) is a representation of the brightness information of a scene along a line running from the top to the bottom of the reproduced image. The scene is dark gray at the top, a light gray in the middle and dark gray at the bottom. Waveform (b) is the signal level of the odd field interlaced luminance signal for the odd lines representing the scene which was transmitted and represents the signal at the input of comb filter 5 of FIG. 1.

Waveform (c) is the luminance output of the comb filter 5 of FIG. 1. The comb filter output for a given line is the average (i.e. one-half of the sum) of the current and preceeding transmitted line. Waveform (d) is the vertical detail output from vertical detail extractor 7 of FIG. 1. It is one-half of the difference between the current and the preceeding line. Waveform (e) is a vertical detail restored interlaced luminance signal and is the signal at the output of adder 14. It is the sum of the comb filtered luminance waveform (c) and vertical detail waveform (d) signals. As restored, this restored luminance signal closely matches the transmitted luminance signal illustrated in waveform (b).

Waveform (f) is the interstitial luminance signal produced by interstitial line producer 15 of FIG. 1. These lines are the average of the current and preceeding interlace line and are timed to be displayed in the interstices between the two averaged lines (i.e. in the even numbered lines). Waveform (g) is the interstitial luminance signal restored by subtracting the vertical detail signal illustrated in waveform (d) from the produced interstitial lines and is the output of subtractor 12 of FIG. 1. The two restored signals closely represent the brightness of the scene transmitted. As discussed above, however, it is desirable to enhance vertical transitions.

The vertical detail enhancer illustrated in FIG. 2 operates as follows to enhance the transitions. Assume for this description that non-linear function circuit 55 in this case operates to pass this particular vertical detail signal without change. Waveform (h) is the sum of the restored interlaced luminance signal of waveform (c) and the vertical detail signal of waveform (d) and is the output of adder 40 of FIG. 2. This results in a higher luminance signal for line number 5, and a lower luminance signal for line number 11. Waveform (i) is the restored interstitial luminance signal of waveform (f) minus the vertical detail signal of waveform (d) and is the output of subtractor 45 of FIG. 2. This results in a lower luminance signal for line 4 and a higher luminance signal for line 10. Waveform (j) is the enhanced progressive scan signal for the odd field representing the scene brightness of waveform (a). A similar enhanced progressive scan signal for the even field may also be generated.

FIG. 4 illustrates the source of flickering inherent in the vertical detail enhancer of FIG. 2. Waveform (a) is the enhanced progressive scan signal for the odd field and is the same as FIG. 3 waveform (j). Waveform (b) is the enhanced progressive scan signal for the even field, which is generated in the same manner as is that for the odd field. It is displaced by one display line, however. Waveform (c) shows the superposition of the even field enhanced progressive scan signal on the odd field enhanced progressive scan signal. The solid line represents the odd field and the dashed line the even field enhanced progressive scan signal.

On lines 5 and 11, it is seen that the signal alternates between a bright signal on one field and a dim signal on the next. Thus, the top and bottom lines of the light gray portion of the displayed image flicker between bright and dim at the field repetition rate, making the top and bottom appear fuzzy and objectionable.

Figure 5:
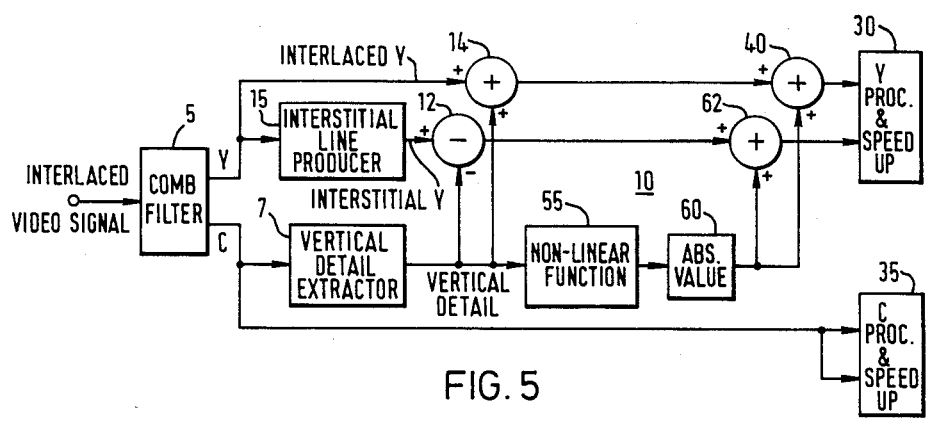
FIG. 5 is a block diagram of a vertical detail enhancer embodying the present invention.

FIG. 5 is an embodiment of a vertical detail enhancer which reduces this objectionable flicker according to the present invention. Elements similar to those in FIGS. 1 and 2 have the same reference numbers and operate in the same manner. They will not be discussed in detail below. In FIG. 5, the output of non-linear function circuit 55, which is the vertical detail enhancement signal, is supplied to an absolute value circuit 60. The output of absolute value circuit 60 is supplied to one input of adders 40 and 62 respectively. The vertical detail restored interlaced Y signal from adder 14 is supplied to another input of adder 40. The vertical detail restored interpolated Y signal from subtractor 12 is supplied to another input of adder 62. The respective outputs of adders 40 and 62 are supplied to the luminance processing and speed up circuit 30.

In operation, the vertical detail enhancer illustrated in FIG. 5 combines the signals whose waveforms are illustrated in FIG. 3 in a different manner than that of the FIG. 2 embodiment. The absolute value of the vertical detail signal of waveform (d) is added to the restored interlaced luminance signal of waveform (e) to form an enhanced interlaced luminance signal. This signal is illustrated as the solid vertical lines in FIG. 6 waveforms (a) and (b).

Referring again to FIG. 3, the absolute value of the vertical detail signal of waveform (d) is added to the vertical detail restored interstitial luminance signal of waveform (g) to form an enhanced interstitial luminance signal. This signal is illustrated as dashed vertical lines in FIG. 6 waveforms (a) and (b).

Figure 6:
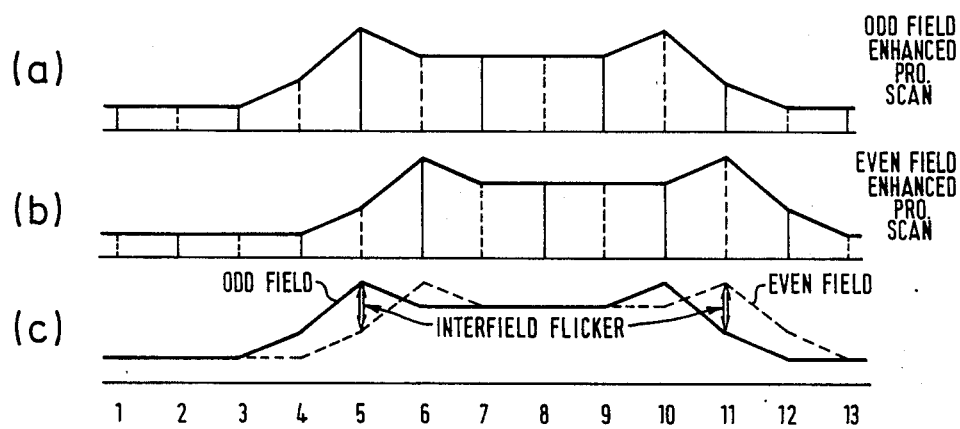
FIG. 6 shows are waveform diagrams illustrating the reduction in flickering of the vertical detail enhancer of FIG. 5.

The undershoot provided by the prior art vertical detail enhancement circuit of FIGS. 1 and 2 has been attenuated in line 4 of waveform (a) and line 5 of waveform (b) of FIG. 6. Also, the backswing has been attenuated in line 11 of waveform (a) and line 12 of waveform (b). FIG. 6 waveform (c) shows the superposition of waveform (a) representing the odd field, and waveform (b) representing the even field, vertical detail enhanced luminance signal. The flicker at lines 5 and 11 is much reduced compared to that shown in FIG. 4 waveform (c). On the other hand, the transitions from dark to light and from light to dark require two lines for the FIG. 5 embodiment, compared to one line for the prior art FIG. 2 circuit.

Figure 7:
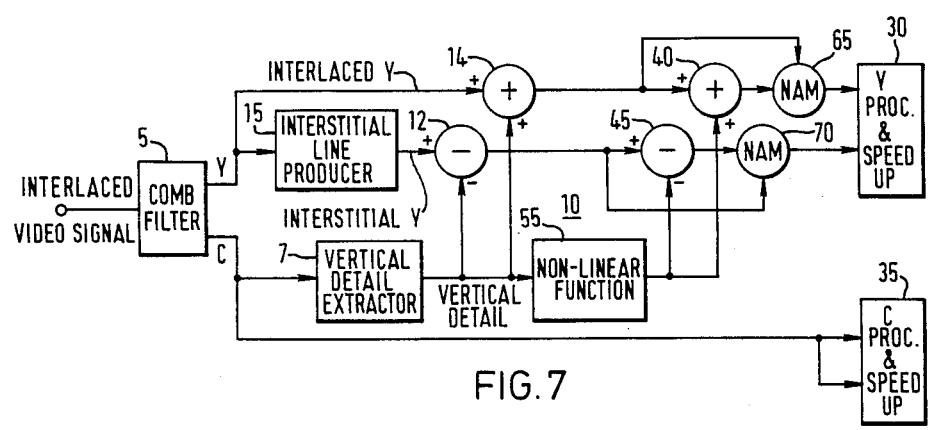
FIG. 7 is a block diagram of a vertical detail enhancer also embodying the present invention.

FIG. 7 is another embodiment of a vertical detail enhancer which reduces the objectionable flicker according to the present invention. Elements similar to those in FIGS. 1 and 2 have the same reference numbers and operate in the same manner. They will not be discussed in detail below. In FIG. 7, the output of the non-linear function circuit 55 is supplied to one input of adder 40 and subtractor 45 respectively. The restored interlaced luminance signal from adder 14 is supplied to another input of adder 40. The restored interstitial luminance signal from subtractor 12 is supplied to another input of subtractor 45.

The output of adder 40 is supplied to one input of a maximizing non-additive mixer 65. The restored interlaced luminance signal from adder 14 is supplied to the other input of maximizing non-additive mixer 65. Maximizing non-additive mixer 65 operates to pass the larger of the input signals. The output of subtractor 45 is supplied to one input of a maximizing non-additive mixer 70. The restored interpolated luminance signal from subtractor 12 is supplied to another input of maximizing non-additive mixer 70. The outputs of maximizing non-additive mixers 65 and 70 are supplied to the luminance processing and speed up circuit 30.

Figure 8:
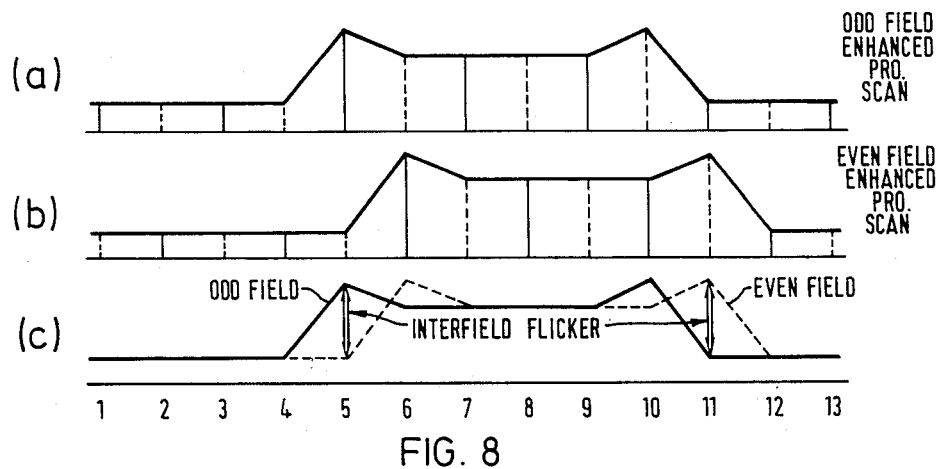
FIG. 8 shows are waveform diagrams illustrating the reduction in flickering of the vertical detail enhancer of FIG. 7.

In operation, maximizing non-additive mixer 65 passes the larger of the restored interlaced luminance signal of FIG. 3 waveform (e) or the enhanced interlaced signal of waveform (h). This is illustrated as the solid vertical lines in FIG. 8 waveforms (a) and (b). Maximizing non-additive mixer 70 passes the larger of the restored interstitial luminance signal of FIG. 3 waveform (g) or the enhanced interstitial luminance signal of waveform (i). This is illustrated as the dashed vertical lines of FIG. 8 waveforms (a) and (b). FIG. 8 waveform (c) shows the superposition of waveform (a), representing the odd field, and waveform (b), representing the even field, vertical detail enhanced signal. The undershoot is attenuated in line 4 of waveform (a) and line 5 of waveform (b) relative to the prior art vertical detail enhancement circuit of FIGS. 1 and 2. In addition, the backswing in line 11 of waveform (a) and in line 12 of waveform (b) is attenuated.

The flicker at lines 5 and 11 is greater than that of the embodiment illustrated in FIG. 5 but is still less than that produced by the prior art vertical detail enhancer of FIG. 2. The transitions from dark to light and from light to dark require only one line for the FIG. 7 embodiment—the same as the prior art vertical detail enhancer.

For both the FIG. 5 and FIG. 7 embodiments, the flicker is reduced from the prior art levels. Thus, letters etc. are displayed with sharper top and bottom edges. In addition, these embodiments required no more memory than that required to implement a line progressive scan system.

The above embodiments of the invention have been described in conjunction with a video processing system which uses a line delay comb filter to separate the luminance and chrominance components from the composite signal. However, a vertical detail enhancer according to the present invention will properly operate on luminance components separated by any means. In addition, such a vertical detail enhancer will properly operate in NTSC, PAL or SECAM television video signal processors.

The present invention may be implemented in either continuous analog or sampled data form. In sampled data form, the embodiment may be implemented in analog or digital form.

What is claimed is:

1. A vertical detail enhancer comprising:
a source of interlaced luminance signals;
a producer of interstitial luminance signals responsive to said interlaced luminance signals;
means for modifying transitions of said interlaced and interstitial luminance signals to produce vertical detail enhanced interlaced and interstitial luminance signals having only overshoot for transitions of a given sense and having only undershoot for transitions of the opposite of said given sense; and
means for sequencing said vertical detail enhanced interlaced and interstitial luminance signals to create a luminance signal representing a progressively scanned image.

2. The vertical detail enhancer of claim 1, wherein said modifying means comprises:
means for generating a vertical detail enhancement signal; and
means for combining said vertical detail enhancement signal with said interlaced and said interstitial luminance signals respectively.

3. A vertical detail enhancer, comprising:
a source of line delay comb filtered chrominance signals;
a source of interlaced luminance signals;
a producer of interstital luminance signals responsive to said interlaced luminance signals;
means for modifying transitions of said interlaced and interstitial luminance signals to produce vertical detail enhanced interlaced and interstitial luminance signals having only overshoot for transitions of a given sense and having only undershoot for transitions of the opposite of said given sense, including means for generating a vertical detail enhancement signal having a vertical detail extractor responsive to said comb filtered chrominance signals for extracting a vertical detail signal and means for producing the absolute value of said vertical detail signal as said vertical detail engancement signal, and means for combining said vertical detail enhancement signal with said interlaced and said interstitial luminance signals respectively.

4. The vertical detail enhancer of claim 3, wherein said vertical detail enhancement signal generator further comprises:
a non-linear function circuit coupled between said vertical detail extractor and said absolute value producing means.

5. The vertical detail enhancer of claim 3, wherein said combining means comprises:

first means for adding said vertical detail enhancement signal to said interlaced luminance signal to produce said vertical detail enhanced interlaced luminance signal; and second means for adding said vertical detail enhancement signal to said interstitial luminance signal to produce said vertical detail enhanced interstitial luminance signal.

6. A vertical detail enhancer, comprising:

a source of interlaced luminance signals;

a producer of interstitial luminance signals responsive to said interlaced luminance signals;

means for modifying transitions of said interlaced and interstitial luminance signals to produce vertical detail enhanced interlaced and interstitial luminance signals having only overshoot for transistions of a given sense and having only undershoot for transitions of the opposite of said given sense, including means for generating a vertical detail enhancement signal and means for combining said vertical detail enhancement signal with said interlaced and said interstitial luminance signals respectively, having means for adding said vertical detail enhancement signal to said interlaced luminance signal, means for subtracting said vertical detail enhancement signal from said interstitial luminance signal, first maximizing non-additive mixer means for passing the larger of said interlaced luminance signal and the output of said adding means as said vertical detail enhanced interlaced luminance signal and second maximizing non-additive mixer means for passing the larger of said interstitial luminance signal and the output of said subtracting means as said vertical detail enhanced interstitial luminance signal.

7. The vertical detail enhancer of claim 6, wherein said vertical detail enhancement signal generator comprises:

a source of line delay comb filtered chrominance signals; and a vertical detail extractor responsive to said comb filtered chrominance signals for extracting a vertical detail signal.

8. The vertical detail enhancer of claim 7, wherein said vertical detail enhancement generator further comprises:

a non-linear function circuit responsive to said vertical detail signal for producing said vertical detail enhancement signal.

9. A vertical detail enhancer comprising:

a source of interlaced composite video signals;

a line delay comb filter producing interlaced comb filtered luminance and chrominance signals;

a producer of interstitial luminance signals responsive to said interlaced luminance signals;

a vertical detail extractor responsive to said comb filtered chrominance signal for producing a vertical detail signal;

first means for adding said vertical detail signal to said interlaced luminance signal to produce a vertical detail restored interlaced luminance signal;

means for subtracting said vertical detail signal from said interstitial luminance signal to produce a vertical detail restored interstitial luminance signal;

a non-linear function circuit responsive to said vertical detail signal;

an absolute value circuit responsive to said non-linear function circuit for producing a vertical detail enhancement signal;

second means for adding said vertical detail enhancement signal to said vertical detail restored interlaced luminance signal to produce a vertical detail enhanced interlaced luminance signal;

third means for adding said vertical detail enhancement signal to said vertical detail restored interstitial luminance signal to produce a vertical detail enhanced interstitial luminance signal;

first means for sequencing said vertical detail enhanced interlaced and interstitial luminance signals to produce a luminance signal representing a progressively scanned image; and second means for sequencing said comb filtered chrominance signal to produce a chrominance signal representing a progressively scanned image.

10. A vertical detail enhancer comprising:

a source of interlaced composite video signals;

a line delay comb filter producing interlaced comb filtered luminance and chrominance signals;

a producer of interstitial luminance signals responsive to said interlaced luminance signals;

a vertical detail extractor responsive to said comb filtered chrominance signal for producing a vertical detail signal;

first means for adding said vertical detail signal to said interlaced luminance signal to produce a vertical detail restored interlaced luminance signal;

first means for subtracting said vertical detail signal from said interstitial luminance signal to produce a vertical detail restored interstitial luminance signal;

a non-linear function circuit responsive to said vertical detail signal for producing a vertical detail enhancement signal;

second means for adding said vertical detail enhancement signal to said vertical detail restored interlaced luminance signal;

second means for subtracting said vertical detail enhancement signal from said vertical detail restored interstitial luminance signal;

first maximizing non-additive mixer means for passing the larger of said vertical detail restored interlaced luminance signal and the output of said second adding means to produce a vertical detail enhanced interlaced luminance signal;

second maximizing non-additive mixer means for passing the larger of said vertical detail restored interstitial luminance signal and the output of said second subtracting means to produce a vertical detail enhanced interstitial luminance signal;

first means for sequencing said vertical detail enhanced interlaced and interstitial luminance signals to produce a luminance signal representing a progressively scanned image; and second means for sequencing said comb filtered chrominance signal to produce a chrominance signal representing a progressively scanned image.

11. A vertical detail enhancer comprising:

a source of luminance signals;

a producer of interstitial luminance signals responsive to said luminance signals;

means for modifying transitions of said luminance and interstitial luminance signals signals to produce vertical detail enhanced luminance and interstital luminance signals having only overshoot for transitions of a given sense and having only undershoot for transitions of the opposite of said given sense; and means for sequencing said vertical detail enhanced luminance and interstitial luminance signals to create a luminance signal representing a progressively scanned image.

\* \* \* \* \*